US011938360B2

(12) United States Patent
Lavi et al.

(10) Patent No.: US 11,938,360 B2
(45) Date of Patent: Mar. 26, 2024

(54) RETROFIT FIRE EXTINGUISHER APPARATUS

(71) Applicant: LEHAVOT PRODUCTION & PROTECTION (1995) LTD., Lehavot Habashan (IL)

(72) Inventors: Shai Lavi, Hoshaya (IL); Aharon Binur, Amir (IL); Yury Konovalenko, Hagoshrim (IL)

(73) Assignee: LEHAVOT PRODUCTION & PROTECTION (1995) LTD., Lehavot Habashan (IL)

( * ) Notice: Subject to any disclaimer, the term of this patent is extended or adjusted under 35 U.S.C. 154(b) by 549 days.

(21) Appl. No.: 17/264,335

(22) PCT Filed: Aug. 1, 2019

(86) PCT No.: PCT/IB2019/056578
§ 371 (c)(1),
(2) Date: Feb. 3, 2021

(87) PCT Pub. No.: WO2020/031037
PCT Pub. Date: Feb. 13, 2020

(65) Prior Publication Data

US 2021/0299503 A1 Sep. 30, 2021

(30) Foreign Application Priority Data

Aug. 6, 2018 (GB) ..................................... 1812726

(51) Int. Cl.
*A62C 37/00* (2006.01)
*A62C 13/76* (2006.01)
*A62C 37/50* (2006.01)

(52) U.S. Cl.
CPC ............. *A62C 37/50* (2013.01); *A62C 13/76* (2013.01)

(58) Field of Classification Search
CPC ................................ A62C 37/50; A62C 13/76
(Continued)

(56) References Cited

U.S. PATENT DOCUMENTS 5,483,826 A * 1/1996 Schultz ................ G01L 19/086 702/140
6,279,664 B1 * 8/2001 Yanovsky ............. A62C 37/50 169/30
(Continued)

FOREIGN PATENT DOCUMENTS

CN 102377458 A 3/2012
CN 2015434761 U 8/2016
(Continued)

OTHER PUBLICATIONS

International Search Report for PCT/IB2019/056578 dated Dec. 29, 2019.
Written Opinion for PCT/IB2019/056578 dated Dec. 29, 2019.

*Primary Examiner* — Max H Noori
(74) *Attorney, Agent, or Firm* — Momentum IP; Marc Van Dyke

(57) ABSTRACT

A retrofit unit for retrofitting a fire extinguisher, the retrofit unit including a body portion, having a connector for connection to the fire extinguisher, an electronic pressure sensor, connected to the body portion, and adapted to sense pressure within the fire extinguisher, a processor adapted to control operation of the pressure sensor and to receive at least one pressure signal sensed by the electronic pressure sensor, a power source adapted to provide power to the processor and to the electronic pressure sensor. The retrofit unit may be fitted onto a fire extinguisher for measuring pressure therein, instead of, or in addition to, a mechanical pressure gauge.

20 Claims, 5 Drawing Sheets

(58) Field of Classification Search
USPC .............................................................. 73/700
See application file for complete search history.

(56) References Cited

U.S. PATENT DOCUMENTS

| | | | | |
|---|---|---|---|---|
| 2004/0070506 | A1 | 4/2004 | Runyon | |
| 2005/0023721 | A1 | 2/2005 | Cominsky | |
| 2005/0231354 | A1 * | 10/2005 | Riedel | H04N 25/76 340/531 |
| 2005/0269110 | A1 | 12/2005 | McSheffrey | |
| 2009/0301739 | A1 | 12/2009 | Rother | |
| 2010/0192695 | A1 | 8/2010 | McSheffrey | |
| 2012/0188076 | A1 | 7/2012 | McSheffrey | |
| 2014/0151071 | A1 * | 6/2014 | Pichard | G06Q 10/06 169/30 |
| 2017/0209725 | A1 | 7/2017 | Hu | |
| 2017/0209726 | A1 * | 7/2017 | Hu | H04Q 9/00 |
| 2018/0169450 | A1 * | 6/2018 | Moffa | G08B 29/145 |
| 2021/0023405 | A1 * | 1/2021 | Werner | A62C 99/0081 |
| 2022/0236102 | A1 * | 7/2022 | Aldossary | G01G 19/413 |
| 2022/0314048 | A1 * | 10/2022 | Baldino | A62C 25/00 |
| 2023/0034481 | A1 * | 2/2023 | Benton | G08B 17/10 |

FOREIGN PATENT DOCUMENTS

| | | | |
|---|---|---|---|
| EP | 2159765 | A1 | 3/2010 |
| KR | 20100026087 | A | 3/2010 |
| KR | 101853638 | B1 | 5/2018 |

* cited by examiner

RETROFIT FIRE EXTINGUISHER APPARATUS

CROSS-REFERENCE TO RELATED APPLICATIONS

This invention claims priority from Great Britain Patent Application No. 1812726.6, filed on Aug. 6, 2018, which application is incorporated by reference for all purposes as if fully set forth herein.

FIELD OF THE INVENTION

The present invention relates to devices and methods for retrofitting a fire extinguisher to provide electronic pressure readings, and to systems and methods that utilize such a retrofitted fire extinguisher.

SUMMARY OF THE INVENTION

According to some teachings of the present invention there is provided a retrofit unit for retrofitting a conventional mechanical fire extinguisher having a pressurized canister, the retrofit unit including:

a body portion having a fluid path, the body portion having:

(i) a first connector for connection to a valve assembly of the fire extinguisher, such that when connected to the valve assembly in an operative mode, the fluid path fluidly communicates with a fluid volume within the canister; and (ii) at least one of (A) a mechanical pressure gauge, and (B) a second connector for connection to the mechanical pressure gauge;

an electronic pressure sensor, connected to the body portion, and adapted to sense a fluid path pressure within the fluid path;

a processor adapted to receive at least one pressure-associated signal sensed by the electronic pressure sensor, and to produce pressure information based on the pressure-associated signal;

a power source adapted to provide power to the processor and to the electronic pressure sensor.

In some embodiments, the first connector is a threaded connector. In some embodiments, the second connector is a threaded connector.

In some embodiments, the body portion includes the mechanical pressure gauge. In some embodiments, the body portion includes the second connector.

In some embodiments, the fluid path pressure is indicative of a pressure of fluid within the fire extinguisher.

In some embodiments, the processor is further adapted to control operation of the electronic pressure sensor.

In some embodiments, the fire extinguisher is a powder fire extinguisher. In some embodiments, the fire extinguisher is a gas fire extinguisher. In some embodiments, the fire extinguisher is a liquid-containing or liquid-mist fire extinguisher. In some embodiments, the fire extinguisher is a portable fire extinguisher.

In some embodiments, the electronic pressure sensor includes a strain-gauge.

In some embodiments, the processor is adapted to periodically receive the pressure-associated signals from the electronic pressure sensor. In some embodiments, the processor is adapted to receive the pressure-associated signals at least once an hour, once every three hours, once every six hours, once every 12 hours, once every 24 hours, once every 48 hours, once every 72 hours, once a week, or once a month.

In some embodiments, the processor is adapted to intermittently receive the pressure-associated signals from the electronic pressure sensor.

In some embodiments, the power source includes a battery. In some embodiments, the battery is adapted to last at least 1 year, at least 2 years, at least 3 years, at least 4 years, at least 5 years, or at least 6 years.

In some embodiments, the retrofit unit further includes a transmitter, functionally associated with the processor, adapted to transmit the pressure information to a remote location.

In some embodiments, the processor is adapted to receive at least two pressure-associated signals from the electronic pressure sensor, the processor is further adapted to identify a change in pressure within the fluid path based on the at least two received signals, and the transmitter is adapted to transmit a notification indicating the identified change, to a user.

In some embodiments, the processor is adapted to receive at least two pressure-associated signals from the electronic pressure sensor at two different times, the processor is further adapted to identify a rate of change in pressure within the fluid path (dP/dt) based on the at least two received signals. In some embodiments, the processor is adapted to receive a plurality of the pressure-associated signals, to identify a drop in the rate of change in pressure within the fluid path (dP/dt), and to transmit a notification indicating the identified drop, to a user, via the transmitter.

In some embodiments, the processor is further adapted to identify a pressure within the fluid path dropping beneath a pre-determined threshold based on the received at least one pressure-associated signal, and the transmitter is adapted to transmit a notification indicating the drop in pressure, to a user.

In some embodiments, the retrofit unit further includes a receiver, adapted to receive at least one communication signal from a remote location. In some embodiments, the at least one communication signal includes reset instruction for resetting operation of the processor. In some embodiments, the at least one communication signal includes a request for a current pressure value within the fluid path. In some embodiments, the at least one communication signal includes a query whether the current pressure value within the fluid path is above a pre-determined lower threshold. In some embodiments, the at least one communication signal includes a query whether the current pressure value within the fluid path is below a pre-determined upper threshold.

In some embodiments, the retrofit unit further includes at least one memory component functionally associated with the processor, wherein the processor is adapted to store the at least one received pressure-associated signal in the at least one memory component.

In some embodiments, the retrofit unit further includes a location sensor functionally associated with the processor, the location sensor adapted to provide to the processor at least one location signal indicating a location of the fire extinguisher. In some embodiments, the processor is adapted to identify a change in location of the fire extinguisher based on the received at least one location signal. In some embodiments, following identification of the change in location, the processor is adapted to transmit a notification to a user indicating the change in location. In some embodiments, following identification of the change in location, the processor is adapted to activate the electronic pressure sensor to provide a pressure signal indicating a pressure within the fluid path.

In some embodiments, the location sensor is adapted to sense whether the fire extinguisher is disposed on or within a specific support structure associated with the fire extinguisher.

In some embodiments, the retrofit unit further includes an orientation sensor functionally associated with the processor, the orientation sensor adapted to provide to the processor at least one orientation signal indicating a three dimensional orientation of the fire extinguisher. In some embodiments, the processor is adapted to identify a change in orientation of the fire extinguisher based on the received at least one orientation signal. In some embodiments, following identification of the change in orientation, the processor is adapted to transmit a notification to a user indicating the change in orientation. In some embodiments, following identification of the change in orientation, the processor is adapted to activate the electronic pressure sensor to provide a pressure signal indicating a pressure within the fluid path.

In some embodiments, the electronic pressure sensor is removably connected to the body portion.

In some embodiments, the retrofit unit further includes a status indicator functionally associated with the power source and with the processor, adapted to provide at least one indication, perceivable by a user, of a status of pressure within the fluid path. In some embodiments, the status indicator is adapted to provide a first indication, perceivable by the user, when a pressure within the fluid path is within a pre-determined range, and a second indication, perceivable by the user and different from the first indication, when a pressure within the fluid path is outside of the pre-determined range. In some embodiments, the at least one indication includes a visual indication.

In some embodiments, the retrofit unit further includes a real time clock (RTC), operative independently of the power source, wherein the RTC is functionally associated with the power source and with the processor, the power source and the processor are adapted to have a first, sleeping mode, in which no measurements take place, and a second, measurement mode, in which the processor controls the electronic pressure sensor to provide the at least one pressure signal, and the RTC is adapted to trigger the power source and the processor to move from the sleeping mode to the measurement mode. In some embodiments, the RTC is adapted to periodically trigger the move from the sleeping mode to the measurement mode. In some embodiments, the RTC is adapted to trigger the move from the sleeping mode to the measurement mode once every hour, once every three hours, once every six hours, once every 12 hours, once every 24 hours, once every 48 hours, once every 72 hours, once a week, once every two weeks, once every three weeks, or once a month.

According to some teachings of the present invention there is further provided a method for retrofitting a fire extinguisher, the method including:

removing a mechanical pressure gauge from a gauge connector of the conventional mechanical fire extinguisher; and connecting to the gauge connector of the conventional mechanical fire extinguisher a retrofit unit according to the description herein.

In some embodiments, the method further includes connecting the mechanical pressure gauge to the retrofit unit.

In some embodiments, the method further includes, prior to the removing, ensuring that no pressurized fire extinguishing material will be emitted from the fire extinguisher during the removing. In some embodiments, the ensuring includes emptying the fire extinguisher. In some embodiments, the ensuring includes sealing the pressurized fire extinguishing material within the fire extinguisher.

In some embodiments, the valve assembly of the fire extinguisher includes a threaded connector, and wherein the removing the mechanical pressure gauge and the connecting the retrofit unit include removing the mechanical pressure gauge and connecting the retrofit unit to the threaded connector.

In some embodiments, the fire extinguisher is a powder fire extinguisher. In some embodiments, the fire extinguisher is a gas fire extinguisher. In some embodiments, the fire extinguisher is a liquid mist fire extinguisher. In some embodiments, the fire extinguisher is a portable fire extinguisher.

According to some teachings of the present invention there is also provided a system for maintenance of a fire extinguisher, including:

a fire extinguisher having a fluid volume including a fire extinguishing substance pressurized therein, the fire extinguisher including a mechanism for emitting the fire extinguishing substance and a valve assembly for connection of a pressure gauge thereto; and a retrofit unit, connected to the valve assembly of the fire extinguisher via a corresponding first connector of the retrofit unit, the retrofit unit including:

- a body portion, including the corresponding first connector and a fluid path, such that the fluid path fluidly communicates with the fluid volume and at least one of (A) a mechanical pressure gauge, and (B) a second connector for connection to the mechanical pressure gauge;
- an electronic pressure sensor, connected to the body portion, and adapted to sense a fluid path pressure within the fluid path;
- a processor adapted to receive at least one pressure-associated signal sensed by the electronic pressure sensor and to produce pressure information based on the pressure-associated signal; and
- a power source adapted to provide power to the processor and to the electronic pressure sensor.

In some embodiments, the first connector is a threaded connector. In some embodiments, the second connector is a threaded connector.

In some embodiments, the body portion includes the mechanical pressure gauge. In some embodiments, the body portion includes the second connector.

In some embodiments, the fluid path pressure is indicative of a pressure within the fluid volume.

In some embodiments, the processor is further adapted to control operation of the electronic pressure sensor.

In some embodiments, the fire extinguisher is a powder fire extinguisher. In some embodiments, the fire extinguisher is a gas fire extinguisher. In some embodiments, the fire extinguisher is a liquid-mist fire extinguisher. In some embodiments, the fire extinguisher is a portable fire extinguisher.

In some embodiments, the electronic pressure sensor of the retrofit unit includes a strain-gauge.

In some embodiments, the processor of the retrofit unit is adapted to periodically receive the pressure-associated signals from the electronic pressure sensor. In some embodiments, the processor of the retrofit unit is adapted receive the pressure-associated signals at least once an hour, once every three hours, once every six hours, once every 12 hours, once every 24 hours, once every 48 hours, once every 72 hours, or once a week.

In some embodiments, the processor of the retrofit unit is adapted to intermittently receive the pressure-associated signals from the electronic pressure sensor.

In some embodiments, the power source includes a battery. In some embodiments, the battery is adapted to last at least 1 year, at least 2 years, at least 3 years, at least 4 years, at least 5 years, or at least 6 years.

In some embodiments, the retrofit unit further includes a transmitter, functionally associated with the processor, adapted to transmit the pressure information to a remote location.

In some embodiments, the processor of the retrofit unit is adapted to receive at least two pressure-associated signals from the electronic pressure sensor, the processor is further adapted to identify a change in pressure within the fluid path based on at least two received signals, and the transmitter is adapted to transmit a notification indicating the identified change, to a user.

In some embodiments, the processor is adapted to receive at least two pressure-associated signals from the electronic pressure sensor at two different times, and the processor is further adapted to identify a change in pressure within the fluid path during a specific duration (dP/dt) within the fire extinguisher based on the at least two received signals. In some embodiments, the processor is adapted to receive a plurality of the pressure-associated signals, to identify a drop in the change in pressure within the fluid path during a specific duration (dP/dt), and to transmit a notification indicating the identified drop, to a user, via the transmitter.

In some embodiments, the processor of the retrofit unit is further adapted to identify a pressure within the fluid path dropping beneath a pre-determined threshold based on the received at least one signal, and the transmitter is adapted to transmit a notification indicating the drop in pressure, to a user.

In some embodiments, the retrofit unit further includes a receiver, adapted to receive at least one communication signal from a remote location. In some embodiments, the at least one communication signal includes reset instruction for resetting operation of the processor. In some embodiments, the at least one communication signal includes a request for a current pressure value within the fluid path. In some embodiments, the at least one communication signal includes a query whether the current pressure value within the fluid path is above a pre-determined lower threshold. In some embodiments, the at least one communication signal includes a query whether the current pressure value within the fluid path is below a pre-determined upper threshold.

In some embodiments, the system further includes at least one memory component functionally associated with the processor, wherein the processor is adapted to store the at least one received pressure-associated signal in the at least one memory component. In some embodiments, the at least one memory component forms part of the retrofit unit. In some embodiments, the at least one memory component is a remote memory component located remotely to the retrofit unit, and the processor is adapted to transmit the at least one received pressure-associated signal to the remote memory component for storage therein.

In some embodiments, the retrofit unit further includes a location sensor functionally associated with the processor, the location sensor adapted to provide to the processor at least one location signal indicating a location of the fire extinguisher. In some embodiments, the processor is adapted to identify a change in location of the fire extinguisher based on the received at least one location signal. In some embodiments, following identification of the change in location, the processor is adapted to transmit a notification to a user indicating the change in location. In some embodiments, following identification of the change in location, the processor is adapted to activate the electronic pressure sensor to provide a pressure-associated signal indicating a pressure within the fluid path.

In some embodiments, the system further includes a support structure sized and adapted to have the fire extinguisher disposed therein. In some embodiments, the location sensor is adapted to sense whether the fire extinguisher is disposed on or within the support structure.

In some embodiments, the retrofit unit further including an orientation sensor functionally associated with the processor, the orientation sensor adapted to provide to the processor at least one orientation signal indicating a three dimensional orientation of the fire extinguisher. In some embodiments, the processor is adapted to identify a change in orientation of the fire extinguisher based on the received at least one orientation signal. In some embodiments, following identification of the change in orientation, the processor is adapted to transmit a notification to a user indicating the change in orientation. In some embodiments, following identification of the change in orientation, the processor is adapted to activate the electronic pressure sensor to provide a pressure-associated signal indicating a pressure within the fluid path.

In some embodiments, the electronic pressure sensor is removably connected to the body portion of the retrofit unit.

In some embodiments, the retrofit unit further includes a status indicator functionally associated with the power source and with the processor, the status indicator adapted to provide at least one indication, perceivable by a user, of a status of pressure within the fluid path. In some embodiments, the status indicator is adapted to provide a first indication, perceivable by the user, when a pressure within the fluid path is within a pre-determined range, and a second indication, perceivable by the user and different from the first indication, when a pressure within the fluid path is outside of the pre-determined range. In some embodiments, the at least one indication includes a visual indication.

In some embodiments, the retrofit unit further includes a real time clock (RTC), operative independently of the power source. In some embodiments, the RTC is functionally associated with the power source and with the processor, the power source and the processor are adapted to have a first, sleeping mode, in which no measurements take place, and a second, measurement mode, in which the processor controls the electronic pressure sensor to provide the at least one pressure signal, and the RTC is adapted to trigger the power source and the processor to move from the sleeping mode to the measurement mode. In some embodiments, the RTC is adapted to periodically trigger the move from the sleeping mode to the measurement mode. In some embodiments, the RTC is adapted to trigger the move from the sleeping mode to the measurement mode once every hour, once every three hours, once every six hours, once every 12 hours, once every 24 hours, once every 48 hours, once every 72 hours, once a week, once every two weeks, once every three weeks, or once a month.

BRIEF DESCRIPTION OF THE FIGURES

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. Throughout the drawings, like-referenced characters are used to designate like functionalities, but not necessarily identical elements.

In the drawings.

DETAILED DESCRIPTION

Devices and methods are described herein for retrofitting a fire extinguisher to enable it to automatically report its pressure status, and/or to provide an indicating of the fire extinguisher being moved, tilted, or otherwise tampered with.

As used herein in the specification and in the claims section that follows, the terms "pressure reading", "pressure signal", and "pressure-associated signal" are used interchangeably, and relate to a signal obtained from a pressure sensor regarding a fluid pressure within a volume, which fluid pressure is sensed by the pressure sensor.

As used herein in the specification and in the claims section that follows, the term "or" is considered as inclusive, and therefore the phrase "A or B" means any of the groups "A", "B", and "A and B".

As used herein in the specification and in the claims section that follows, the phrase "at least one of A and B" is equivalent to an inclusive "or", and includes any one of "only A", "only B", or "A and B". Similarly, the phrase "at least one of A, B, and C" is equivalent to an inclusive "or", and includes any one of "only A", "only B", "only C", "A and B", "A and C", "B and C", or "A and B and C".

As used herein in the specification and in the claims section that follows, the term "standard mechanical fire extinguisher" relates to a fire extinguisher including a pressurized canister housing a fire extinguishing fluid, a valve assembly for releasing the fire extinguishing fluid from the canister, and a mechanical, non-electronic, pressure gauge. The standard mechanical fire extinguisher is devoid of an electronic pressure sensor, and/or of any electronic components.

As used herein in the specification and in the claims section that follows, the term "periodically" relates to an action or a measurement carried out at regular intervals having a fixed period therebetween, such as once every minute, once every hour, once every day, once every week, etc.

As used herein in the specification and in the claims section that follows, the term "intermittently" relates to an action or a measurement carried out at intervals which need not necessarily have a fixed period therebetween, or even a well-defined schedule. For example, an intermittent action may be carried out in response to a specific occurrence, such as a user request, or a signal provided by a sensor such as an orientation or location sensor.

Figure 1:
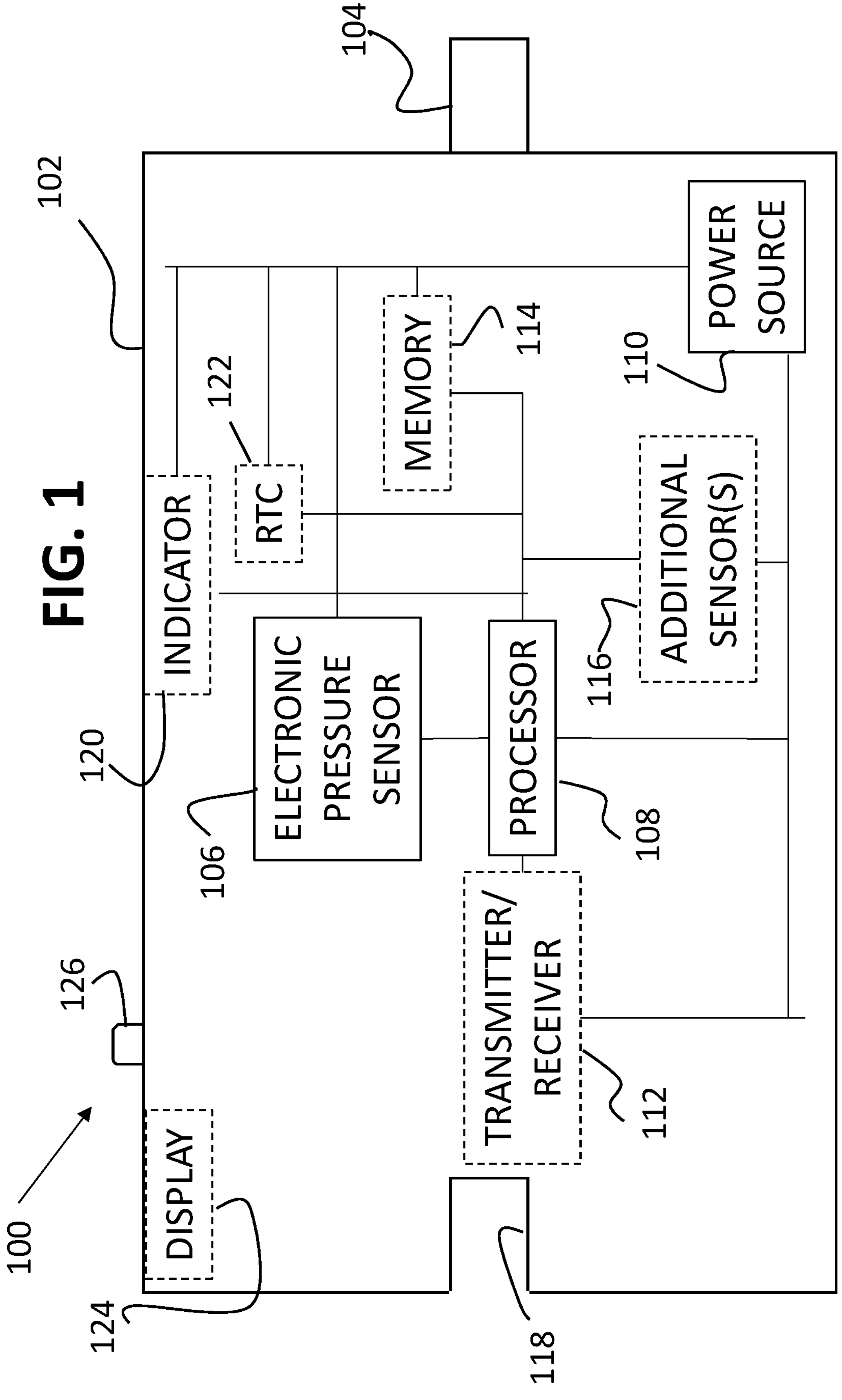
FIG. 1 is a schematic block diagram of an embodiment of a retrofit unit for retrofitting a fire extinguisher, according to an embodiment of the teachings herein.

Reference is now made to FIG. 1, which is a schematic block diagram of an embodiment of a retrofit unit for retrofitting a standard, mechanical fire extinguisher, according to an embodiment of the teachings herein. The fire extinguisher includes a valve assembly and a pressurized canister including a fire extinguishing fluid therein, as well known in the art.

As seen, a retrofit unit 100 for retrofitting a standard, mechanical fire extinguisher to be able to provide reports of its own status, includes a body portion 102 having a first connector 104 for connection to a valve assembly of the fire extinguisher. The body portion includes a fluid path 105 therethrough, which fluid path 105 is in fluid flow communication with a fluid in the pressurized canister of the fire extinguisher.

Connected to body portion 102 is an electronic pressure sensor 106, adapted to sense a fluid-path pressure within the fluid path. The fluid-path pressure is indicative of the pressure within the fire extinguisher. As such, whenever the specification and claims herein relate to the pressure within the fire extinguisher, the measured value is actually that of the pressure within the fluid-path which is indicative of the pressure within the fire extinguisher.

A processor 108, mounted onto or within body portion 102, is functionally associated with electronic pressure sensor 106 and is adapted to receive at least one pressure-associated signal sensed by electronic pressure sensor 106 and/or to control operation of the electronic pressure sensor. The processor 108 is further adapted to produce pressure information based on the received pressure-associated signal(s).

A power source 110, typically disposed within body portion 102, is adapted to provide power to processor 108 and to electronic pressure sensor 106.

In some embodiments, connector 104 may be a threaded connector.

In some embodiments, electronic pressure sensor 106 may be a strain gauge, or any other suitable electronic pressure sensor.

In some embodiments, electronic pressure sensor 106 is removably (i.e., in reversible fashion) connected to body portion 102.

Figure 4A:
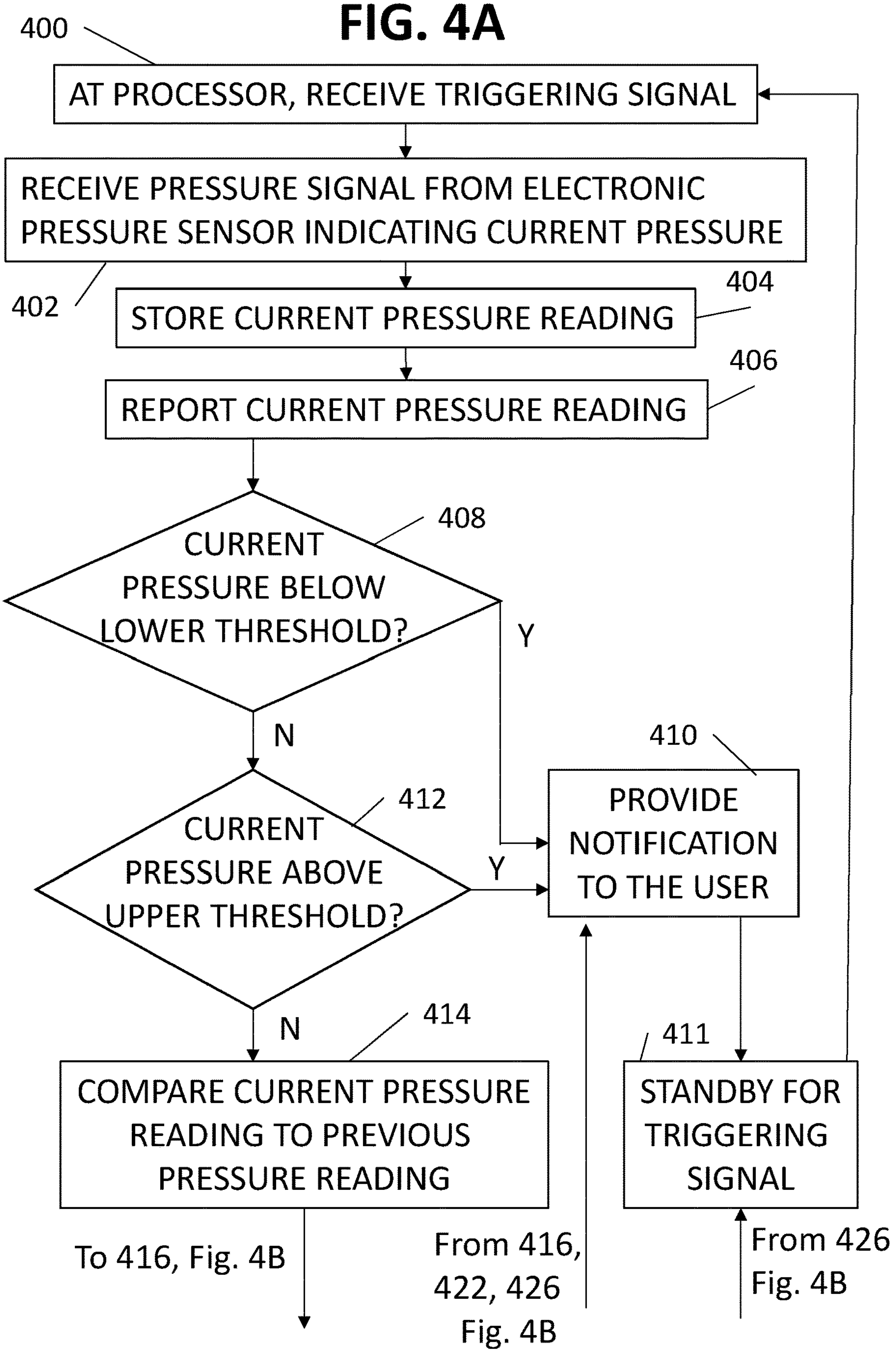
FIGS. 4A-4B provide a schematic flow chart of a method of using the retrofit unit of FIG. 1 to obtain a status report of a fire extinguisher.
Figure 4B:
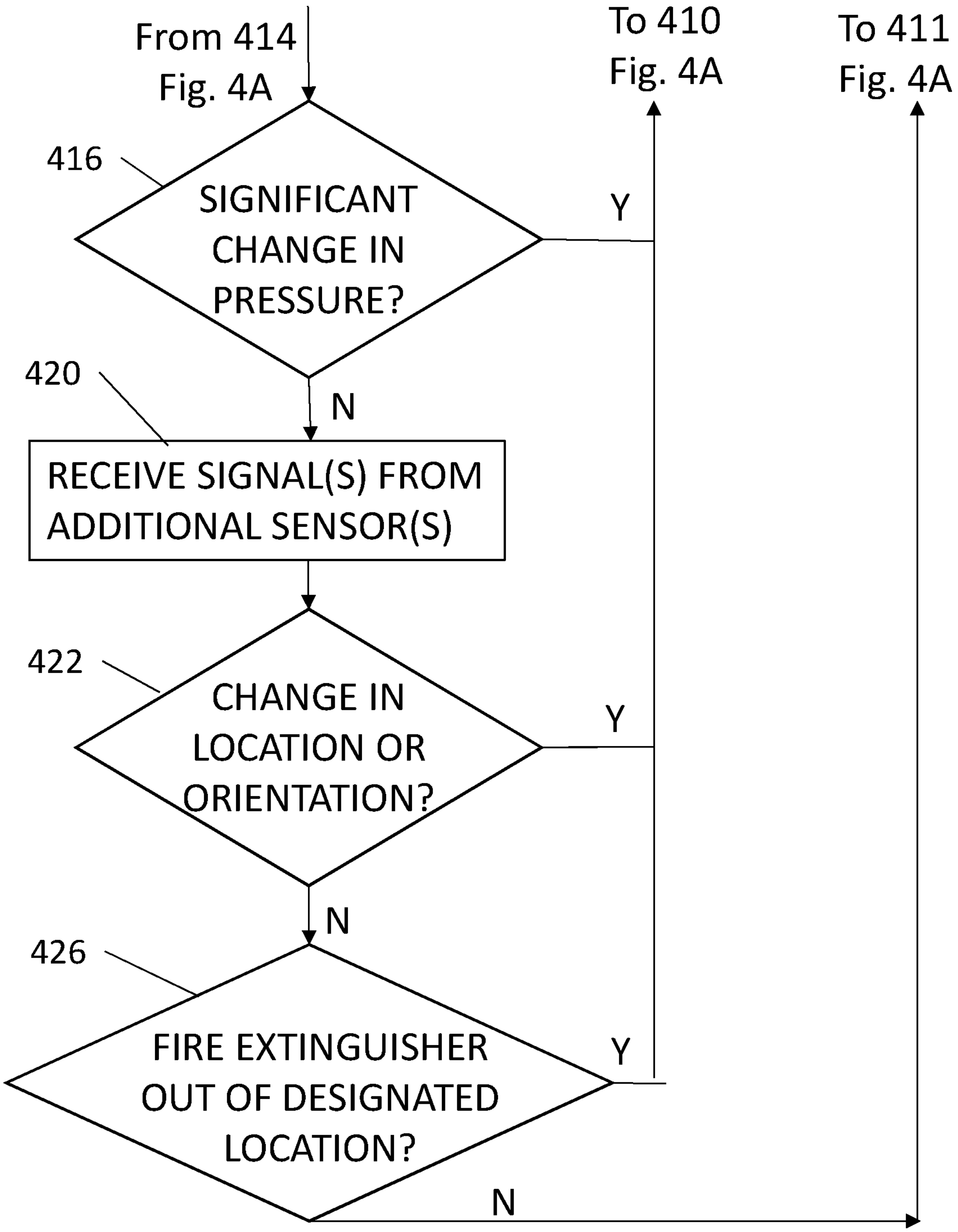

Processor 108 is adapted to receive signals from and/or to control operation of electronic pressure sensor 106 so as to provide pressure information indicating pressure within the fire extinguisher, as described in further detail with respect to FIGS. 4A-B.

In some embodiments, power source 110 comprises a battery, such as a rechargeable battery, an alkaline battery, or any other suitable type of battery. In some such embodiments, the battery is adapted to last at least 1 year, at least 2 years, at least 3 years, at least 4 years, at least 5 years, or at least 6 years, under standard operation conditions of the retrofit unit, exemplary operation conditions being described hereinbelow with respect to FIGS. 4A-4B.

In some embodiments, retrofit unit 100 further includes a transmitter and a receiver, or a transceiver 112, functionally associated with processor 108. The transmitter or transceiver 112 is adapted to transmit at least one pressure-associated signal of electronic pressure sensor 106, and/or pressure information, from processor 108 to a remote location, for displaying or otherwise providing the pressure reading(s) and/or the pressure information to a fire extinguisher maintenance operator, and/or for storage of pressure reading(s) and/or the pressure information. In some embodiments, the transmitter or transceiver 112 is adapted to transmit a notification indicating a change in the status of the pressure within the fluid path and/or fire extinguisher as described hereinbelow with respect to FIGS. 4A-4B.

In some embodiments, the receiver or transceiver 112 is adapted to receive one or more communication signals from a remote location. For example, the communication signal may be a reset instruction for resetting operation of processor 108, a request for a current pressure reading within the fluid path and/or the fire extinguisher to be provided by electronic pressure sensor 106, a query whether a current pressure reading is within a suitable range, or any other control signal. The communication signal may be provided, for example, from a central control unit, or from a computing device operated by a fire extinguisher maintenance operator.

In some embodiments, retrofit unit 100 further includes at least one memory component 114, functionally associated with processor 108, processor 108 being adapted to store at least one pressure reading of electronic pressure sensor 106 within memory component 114.

In some embodiments, retrofit unit 100 further includes at least one additional sensor 116, functionally associated with processor 108.

In some embodiments, the additional sensor 116 includes a location sensor, adapted to provide to processor 108 a location signal indicating a location of the retrofit unit, and of the fire extinguisher connected thereto. In some such embodiments, processor 108 is adapted to identify a change in location of the fire extinguisher based on such location signals, as described hereinbelow with reference to FIGS. 4A-4B. For example, the location sensor may be a GPS sensor or any other suitable location sensor.

In some embodiments, the additional sensor 116 includes an orientation sensor, adapted to provide to processor 108 an orientation signal indicating a three dimensional orientation of the retrofit unit, and of the fire extinguisher connected thereto. In some such embodiments, processor 108 is adapted to identify a change in orientation of the fire extinguisher based on such orientation signals, as described hereinbelow with reference to FIGS. 4A-4B. For example, the orientation sensor may be an accelerometer, a motion sensor, or any other suitable orientation sensor.

In some embodiments, body portion 102 further includes a second connector 118 for connection of a second pressure sensor, such as a mechanical pressure gauge, to retrofit unit 100, for example as described hereinbelow with respect to FIGS. 2 and 3. In some embodiments, second connector 118 is a threaded connector.

In some embodiments, retrofit unit 100 further includes a status indicator 120, functionally associated with processor 108 and with power source 110. Status indicator 120 is adapted to provide at least one indication, perceivable by a user located in the vicinity of retrofit unit 100, of a status of pressure within the fire extinguisher. In some embodiments, status indicator 120 may include a visual status indicator, adapted to provide a visible indication of the status of pressure within the fire extinguisher. For example, the status indicator may show a green light when the pressure within the fire extinguisher is within a pre-determined range of acceptable pressure values, and a red light when the pressure within the fire extinguisher is too low or too high, and is outside of the predetermined range. In some embodiments, status indicator 120 may include an audio status indicator, adapted to provide an audible indication of the status of pressure within the fire extinguisher. For example, the status indicator may sound an alarm when pressure within the fire extinguisher is outside of the predetermined range.

In some embodiments, retrofit unit 100 further includes a Real Time Clock (RTC) 122, operative independently of power source 110.

In some embodiments, processor 108 and power source 110 have a first, sleeping mode, in which no measurements take place, and no power is provided to components of retrofit unit 100, and a second, measurement mode, in which power source 110 powers processor 108 and processor 108 controls operation of electronic pressure sensor 106 to provide at least one pressure reading. In some such embodiments, RTC 122 is functionally associated with processor 108 and with power source 110, and is adapted to trigger processor 108 and power source 110 to transition from the sleeping mode to the measurement mode, for example according to a predetermined schedule.

In some embodiments, the predetermined schedule is a periodic schedule, for example triggering transition of processor 108 and power source 110 from the sleeping mode to the measurement mode at least once every hour, once every three hours, once every six hours, once every 12 hours, once every 24 hours, once every 48 hours, once every 72 hours, once a week, once every two weeks, once every three weeks, or once a month In some embodiments, retrofit unit 100 further includes a display 124 and a user actuation button 126, both functionally associated with processor 108. In such embodiments, when the user presses button 126, processor 108 obtains from electronic pressure sensor 106 a current pressure signal, and provides information relating to the current pressure within the fire extinguisher on display 124.

Figure 2:
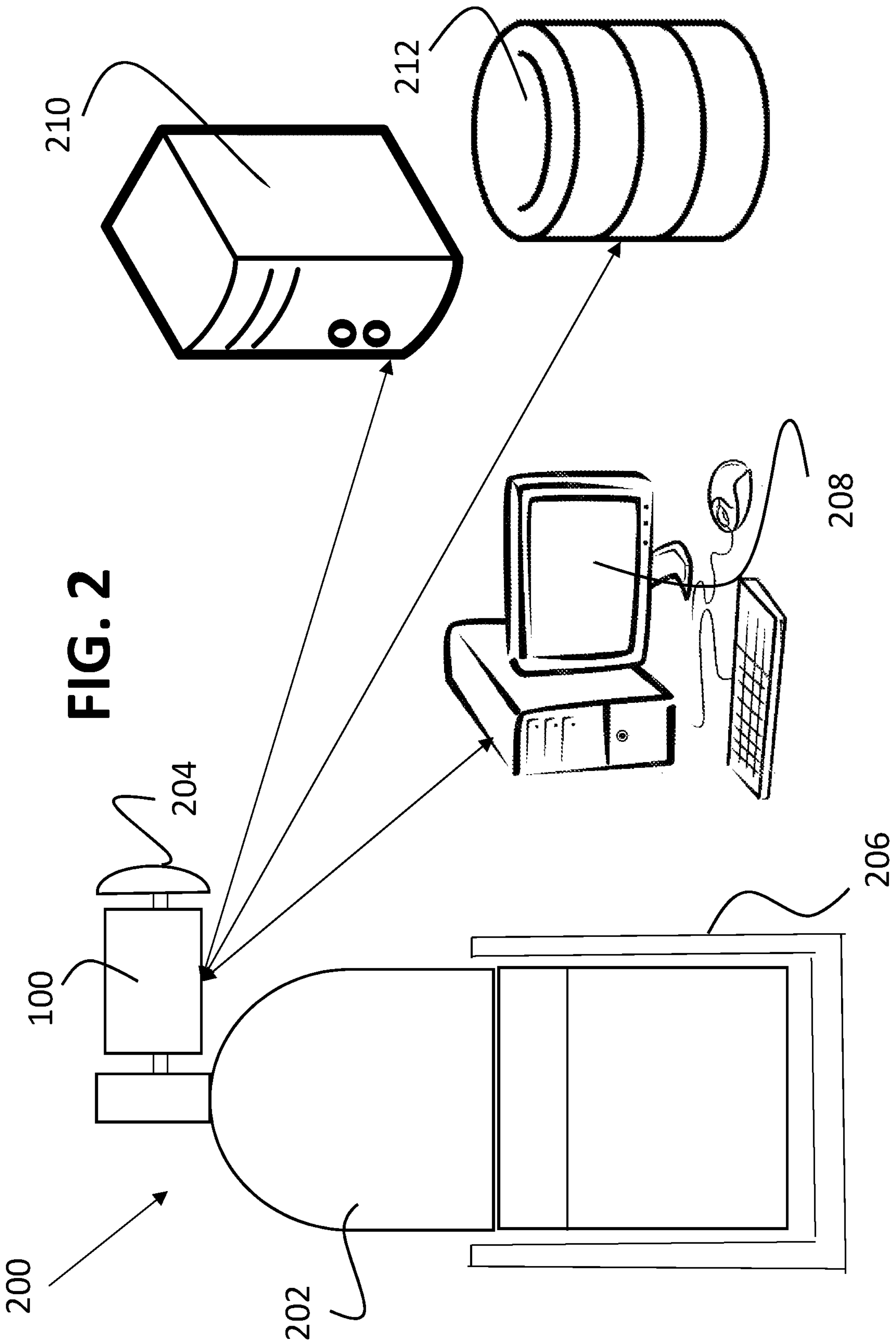
FIG. 2 is a schematic drawing of a system including a fire extinguisher fitted with the retrofit unit of FIG. 1, according to an embodiment of the teachings herein.

Reference is additionally made to FIG. 2, which is a schematic drawing of a system 200 including a fire extinguisher 202 fitted with retrofit unit 100 of FIG. 1, according to an embodiment of the teachings herein.

As described in further detail hereinbelow, the retrofit unit 100 is fitted, via connector 104 thereof, to a connector of the fire extinguisher 202, which connector previously fitted a mechanical pressure gauge 204. In some embodiments, the mechanical pressure gauge 204 is connected to the second connector 118 of the retrofit unit, as illustrated in FIG. 2.

In some embodiments, the connector of fire extinguisher 202 is a threaded connector.

In some embodiments, fire extinguisher 202 is a powder fire extinguisher. In some embodiments, fire extinguisher 202 is a gas fire extinguisher. In some embodiments, fire extinguisher 202 is a liquid-mist fire extinguisher. However, any other suitable type of fire extinguisher is considered to be within the scope of the invention.

In some embodiments, fire extinguisher 202 is a portable fire extinguisher.

In some such embodiments, system 200 further includes a bracket or support structure 206, in which fire extinguisher 202 is typically accommodated. In some such embodiments, processor 108 of retrofit unit 100 is adapted to identify whether or not fire extinguisher 202 is disposed within support structure 206, for example based on signals from one or more additional sensor(s) 116. For example, additional sensor 116 may include an RFID tag reader adapted to read an RFID tag of support structure 206, and when the RFID tag of support structure 206 is not in proximity, processor 108 receives an indication that fire extinguisher 202 is not in support structure 206. As another example, additional sensor 116 may include a proximity sensor adapted to identify a distance between retrofit unit 100 and support structure 206, and to notify the processor when this distance is greater than a predetermined threshold amount. As a further example, additional sensor 116 may include a mechanical pressure sensor, adapted to sense pressure applied by a suitable portion of support structure 206 on fire extinguisher 202 and/or on retrofit unit 100 when the fire extinguisher is disposed within the support structure, and to provide an indication that the fire extinguisher has been removed from the support structure when no such pressure is sensed for a predetermined duration.

In some embodiments, system 200 comprises a network including, in addition to fire extinguisher 202 and retrofit unit 100, at least one other network node, such as a controller workstation 208, a server 210, and/or a remote memory component or database 212.

In some embodiments, transceiver 112 of retrofit unit 100 is adapted to send signals to the other network nodes. For example, a pressure signal received from electronic pressure sensor 106 may be transmitted to the controller workstation 208 for the controller's attention, or may be stored in remote storage component 212. As another example, a signal indicating a change in the pressure within fire extinguisher 202, or the pressure being outside of a predetermined acceptable range, may be transmitted to the controller workstation 208 as an indication that the fire extinguisher may require refilling, replacement, or other maintenance.

In some embodiments, transceiver 112 of retrofit unit 100 is adapted to receive signals from other network nodes. For example, controller workstation 208 may provide a signal to retrofit unit 100. The signal may include a reset instruction for resetting operation of processor 108, a request for a current pressure value within fire extinguisher 202, and/or a query whether the current pressure value within fire extinguisher 202 is within a predetermined acceptable threshold range.

Figure 3:
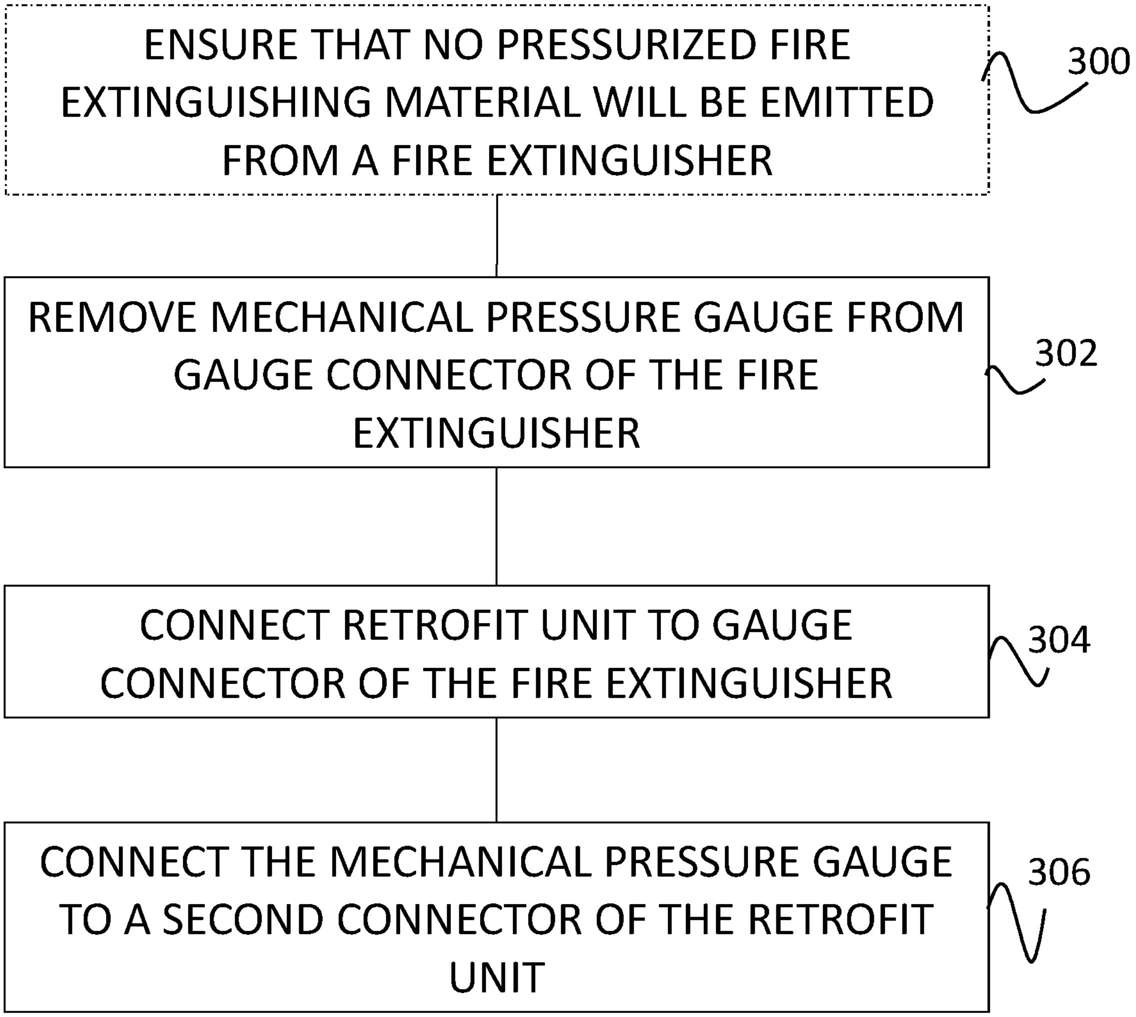
FIG. 3 is a schematic flow chart of a method of retrofitting a fire extinguisher using a the retrofit unit of FIG. 1.

Reference is now made to FIG. 3, which is a schematic flow chart of a method of retrofitting a fire extinguisher, such as fire extinguisher 202 of FIG. 2, using retrofit unit 100 of FIG. 1.

As seen in FIG. 3, at step 300 a mechanical pressure gauge, such as pressure gauge 204 of FIG. 2, is removed from a gauge connector of a fire extinguisher, such as fire extinguisher 202 of FIG. 2.

In some embodiments, at step 302, which takes place prior to removal of the mechanical pressure gauge, a user removing the mechanical pressure gauge ensures that no pressurized fire extinguishing material will be emitted from the fire extinguisher during the removal of the mechanical pressure gauge. For example, such ensuring may include emptying the fire extinguisher from fire extinguishing material prior to removal of the mechanical pressure gauge, or sealing the pressurized fire extinguishing material within the fire extinguisher prior to removal of the mechanical pressure gauge.

Following removal of the mechanical pressure gauge at step 300, a retrofit unit, for example unit 100 of FIG. 1, is connected to the gauge connector of the fire extinguisher at step 304, for example using connector 104 of the retrofit unit.

In some embodiments, at step 306, the mechanical pressure gauge removed from the fire extinguisher at step 300 is connected to the retrofit unit via a second connector, such as connector 118 of FIG. 1.

Reference is now made to FIGS. 4A-4B, which collectively provide a schematic flow chart of a method of using retrofit unit 100 of FIG. 1 to obtain a status report of a fire extinguisher, such as fire extinguisher 202 of FIG. 2.

As seen, at step 400, processor 108 of the retrofit unit 100 receives a triggering signal, and subsequently, at step 402, the processor triggers the electronic pressure sensor 106 to sense the pressure within the fire extinguisher, and to provide to processor 108 a signal indicating the sensed pressure.

In some embodiments, the triggering signal is received from a clock. For example, if the processor is programmed to obtain a pressure reading every day at 12 noon, the clock indicating that time constitutes the triggering signal received by the processor. As another example, if the processor is programmed to obtain a pressure reading every three hours, the clock indicating that three hours have passed since the last pressure reading constitutes the triggering signal received by the processor.

In some embodiments, the triggering signal is received from RTC 122. In some such embodiments, the processor 108, power source 110, and electronic pressure sensor 106, have two modes of operation a sleeping mode and a measurement mode. Processor 108, power source 110, and electronic pressure sensor 106 are in the sleeping mode, until receipt of a triggering signal from RTC 122, which functions as the triggering signal and transitions processor 108, power source 110, and electronic pressure sensor 106 into the measurement mode.

In some embodiments, the RTC provides the triggering signals periodically. In some embodiments, the RTC provides such triggering signals at least once every hour, once every three hours, once every six hours, once every 12 hours, once every 24 hours, once every 48 hours, once every 72 hours, once a week, once every two weeks, once every three weeks, or once a month.

In some embodiments, the triggering signal is received from a user. For example, in embodiments in which retrofit unit 100 includes user actuation button 126, a triggering signal is received when the user presses button 126, thereby requesting a current pressure reading with the fire extinguisher. As another example, a user located remotely to the fire extinguisher, such as a maintenance operator, may provide a triggering signal to processor 108 from a remote location, such as controller workstation 208 (FIG. 2), which triggering signal may be received via transceiver 112 of retrofit unit 100. The triggering signal may explicitly request the current pressure reading within the fire extinguisher, or may be a query relating to a change in pressure or to whether the current pressure is within a predetermined range.

In some embodiments, step 402, in which the processor triggers the electronic pressure sensor to provide pressure signals, is carried out periodically, for example at least once in an hour, once every three hours, once every six hours, once every 12 hours, once every 24 hours, once every 48 hours, once every 72 hours, or once a week.

In some embodiments, step 402, in which the processor triggers the electronic pressure sensor to provide pressure signals, is carried out intermittently, for example in response to requests from a user, or according to a predetermined schedule.

In some embodiments, following receipt of the current pressure reading from electronic pressure sensor 106, at step 404 processor 108 stores the current pressure reading, in some embodiments together with a time stamp, in a suitable memory component. For example, the current pressure reading may be stored in memory 114 of retrofit unit 100. As another example, the current pressure reading may be transmitted, for instance by transceiver 112 of retrofit unit 100, to a remote memory component, such as database 212 (FIG. 2), for storage therein.

Additionally or alternatively, in some embodiments, at step 406, processor 108 reports the current pressure reading, typically together with a timestamp. For example, the report may be provided on display 124 of retrofit unit 100, and/or may be transmitted by transceiver 112 to a remote location, such as controller workstation 208 or server 210 (FIG. 2).

At step 408, processor 108, evaluates whether or not the current pressure within the fire extinguisher is below a predetermined lower threshold. If the current pressure is below the lower threshold, a notification is provided to the user at step 410. The notification indicates that the pressure within the fire extinguisher is out of range, and may be provided in any suitable manner. For example, the notification may be transmitted by transceiver 112 to a computing device associated with the user, such as controller workstation 208 (FIG. 2). As another example, the notification may be provided by indicator 120 of retrofit unit 100, for example by blinking a red light instead of showing a green light (indicating that all is in order), or by sounding an alarm sound. As yet another example, the notification may be provided visually on display 124 of retrofit unit 100, for example by displaying a suitable text.

If the current pressure is above the lower threshold, at step 412, processor 108, evaluates whether or not the current pressure within the fire extinguisher is above a predetermined upper threshold. If the current pressure is above the upper threshold, a notification is provided to the user at step 410.

If at steps 408 and 412 it is determined that the current pressure in the fire extinguisher is within the threshold limits, at step 414 the current pressure reading is compared to a previous pressure reading stored in a memory component, such as memory 114 or database 212. The comparison may be carried out by processor 108 or by a remote computing device, such as controller workstation 208 or server 210.

At step 416, processor 108 (or the remote computing device) assesses whether there was a significant change between the previous pressure reading and the current pressure reading. In the context of the present application and claims, a significant change is defined as a change of at least 5%, at least 10%, or at least 15% in the pressure within the fire extinguisher. If a significant change is identified, the method returns to step 410 and a notification is provided to the user, the notification indicating the change in pressure.

In some embodiments, instead of identifying a significant change in the actual pressure within the fire extinguisher or within the fluid path, processor 108 identifies a drop in a rate of change of such pressure. That is, at at least two time points, and based on at least two pressure signals at each time point, the processor 108 identifies a rate of change in pressure within the fluid path (dP/dt) based on the at least two received signals, and then identifies whether there has been a change, or a drop, in the identified rate of change between the two time points. If such a drop in the rate of change was identified, a notification may be provided to the user, as described herein. Otherwise, if no significant change is identified, at step 420, processor 108 receives signals from one or more additional sensors 116. For example, the signals may include a location signal received from a location sensor, an orientation signal received from an orientation sensor, a proximity signal received from a proximity sensor, or any other suitable signal.

At step 422, processor 108 (or a remote computing device as described above) assesses whether there has been a change in the orientation and/or in the location of the fire extinguisher. If such a change in location and/or orientation is identified, the method returns to step 410 and a notification is provided to the user, the notification indicating the change in location and/or orientation.

Otherwise, at step 426 processor 108 (or a remote computing device as described above) assesses whether the fire extinguisher has been removed from its designated location, for example is not disposed within support structure 206 (FIG. 2). If the fire extinguisher is not in its designated location, the method returns to step 410 and a notification is provided to the user, the notification indicating that the fire extinguisher is out of place.

Otherwise, if the current pressure is within the threshold range and hasn't changed significantly since the last reading, and the fire extinguisher is in its designated location and in the appropriate orientation, at step 428 processor 108 goes into standby or into a sleeping mode, and awaits the next triggering signal, to be received at step 400 of the next cycle of the method.

It will be appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination. Similarly, the content of a claim depending from one or more particular claims may generally depend from the other, unspecified claims, or be combined with the content thereof, absent any specific, manifest incompatibility therebetween.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

What is claimed is:

1. A retrofit unit for retrofitting a conventional mechanical fire extinguisher having a pressurized canister, the retrofit unit comprising:

a body portion having a fluid path, said body portion having:

(i) a first connector for connection to a valve assembly of the fire extinguisher, such that when connected to said valve assembly in an operative mode, said fluid path fluidly communicates with a fluid volume within the canister; and (ii) at least one of (A) a mechanical pressure gauge, and (B) a second connector for connection to said mechanical pressure gauge;

an electronic pressure sensor, connected to said body portion, and adapted to sense a fluid path pressure within said fluid path;

a processor adapted to receive at least one pressure-associated signal sensed by said electronic pressure sensor, and to produce pressure information based on said pressure-associated signal;

a power source adapted to provide power to said processor and to said electronic pressure sensor, wherein at least one condition selected from the group consisting of a first condition, a second condition, a third condition, a fourth condition, a fifth condition, and a sixth condition is true, and wherein:

I. according to the first condition, the retrofit unit further comprises a transmitter, functionally associated with said processor, adapted to transmit said pressure information to a remote location, said processor is adapted to receive at least two pressure-associated signals from said electronic pressure sensor and to identify a change in pressure within the fluid path based on said at least two received signals, and said transmitter is adapted to transmit a notification indicating said identified change, to a user;

II. according to the second condition, the retrofit unit further comprises a transmitter, functionally associated with said processor, adapted to transmit said pressure information to a remote location, said processor is adapted to receive at least two pressure-associated signals from said electronic pressure sensor at two different times and to identify a rate of change in pressure within said fluid path (dP/dt) based on said at least two received signals;

III. according to the third condition, the retrofit unit further comprises a transmitter, functionally associated with said processor, adapted to transmit said pressure information to a remote location, said processor is further adapted to identify a pressure within said fluid path dropping beneath a pre-determined threshold based on said received at least one pressure-associated signal, and said transmitter is adapted to transmit a notification indicating said drop in pressure, to a user;

IV. according to the fourth condition, the retrofit unit further comprises a location sensor functionally associated with said processor, said location sensor adapted to provide to said processor at least one location signal indicating a location of the fire extinguisher, and said processor is adapted to identify a change in location of the fire extinguisher based on said received at least one location signal;

V. according to the fifth condition, the retrofit unit further comprises an orientation sensor functionally associated with said processor, said orientation sensor adapted to provide to said processor at least one orientation signal indicating a three dimensional orientation of the fire extinguisher, and said processor is adapted to identify a change in orientation of the fire extinguisher based on said received at least one orientation signal; and VI. according to the sixth condition, the retrofit unit further comprises a real time clock (RTC), operative independently of said power source, said RTC is functionally associated with said power source and with said processor, said power source and said processor are adapted to have a first, sleeping mode, in which no measurements take place, and a second, measurement mode, in which said processor controls said electronic pressure sensor to provide said at least one pressure signal, and said RTC is adapted to trigger said power source and said processor to move from said sleeping mode to said measurement mode.

2. The retrofit unit of claim 1, wherein said body portion includes said mechanical pressure gauge.

3. The retrofit unit of claim 1 wherein said body portion includes said second connector.

4. The retrofit unit of claim 1, wherein said fluid path pressure is indicative of a pressure of fluid within the fire extinguisher.

5. The retrofit unit of claim 1, wherein said processor is further adapted to control operation of said electronic pressure sensor.

6. The retrofit unit of claim 1, wherein said processor is adapted to periodically receive said pressure-associated signals from said electronic pressure sensor.

7. The retrofit unit of claim 1, wherein at least the first condition is true.

8. The retrofit unit of claim 1, wherein at least the second condition is true.

9. The retrofit unit of claim 8, wherein said processor is adapted to receive a plurality of said pressure-associated signals, to identify a drop in said rate of change in pressure within said fluid path (dP/dt), and to transmit a notification indicating said identified drop, to a user, via said transmitter.

10. The retrofit unit of claim 1, wherein at least the third condition is true.

11. The retrofit unit of claim 1, further comprising a receiver, adapted to receive at least one communication signal from a remote location.

12. The retrofit unit of claim 11, wherein said at least one communication signal comprises a request for a current pressure value within said fluid path or a query regarding the current pressure value within said fluid path.

13. The retrofit unit of claim 1, wherein at least the fourth condition is true.

14. The retrofit unit of claim 13, wherein, following identification of said change in location, said processor is adapted to activate said electronic pressure sensor to provide a pressure signal indicating a pressure within said fluid path.

15. The retrofit unit of claim 1, wherein at least the fifth condition is true.

16. The retrofit unit of claim 1, further comprising a status indicator functionally associated with said power source and with said processor, adapted to provide at least one indication, perceivable by a user, of a status of pressure within said fluid path.

17. The retrofit unit of claim 16, wherein said status indicator is adapted to provide a first indication, perceivable by the user, when a pressure within said fluid path is within a pre-determined range, and a second indication, perceivable by the user and different from said first indication, when a pressure within said fluid path is outside of said pre-determined range.

18. The retrofit unit of claim 1, wherein at least the sixth condition is true.

19. The retrofit unit of claim 18, wherein said RTC is adapted to periodically trigger said move from said sleeping mode to said measurement mode.

20. A method for retrofitting a fire extinguisher, the method comprising:

removing a mechanical pressure gauge from a gauge connector of the conventional mechanical fire extinguisher; and connecting to the gauge connector of the conventional mechanical fire extinguisher the retrofit unit of claim 1.

* * * * *